E. M. HALBERT.
TRANSMISSION GEAR FOR AUTOMOBILES.
APPLICATION FILED APR. 22, 1916.
1,212,210.
Patented Jan. 16, 1917.
2 SHEETS—SHEET 2.
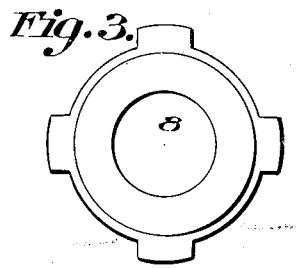
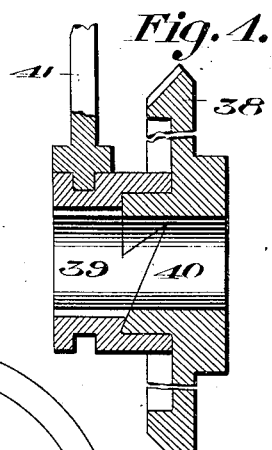
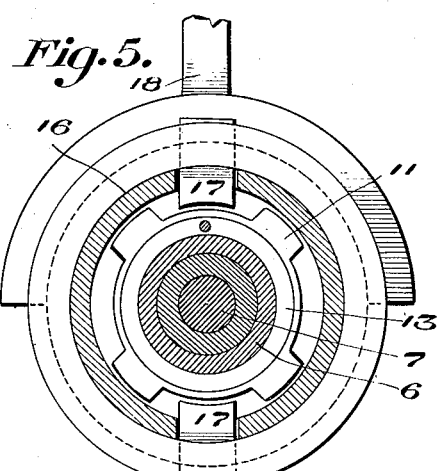
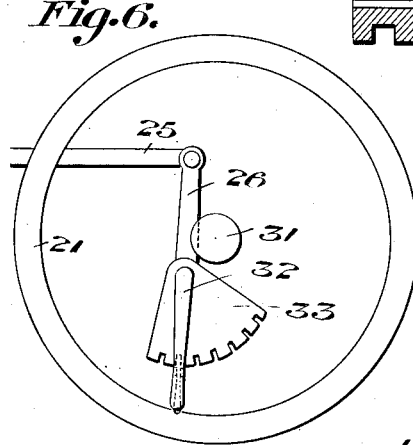
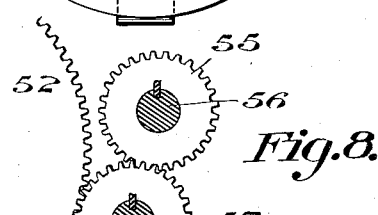
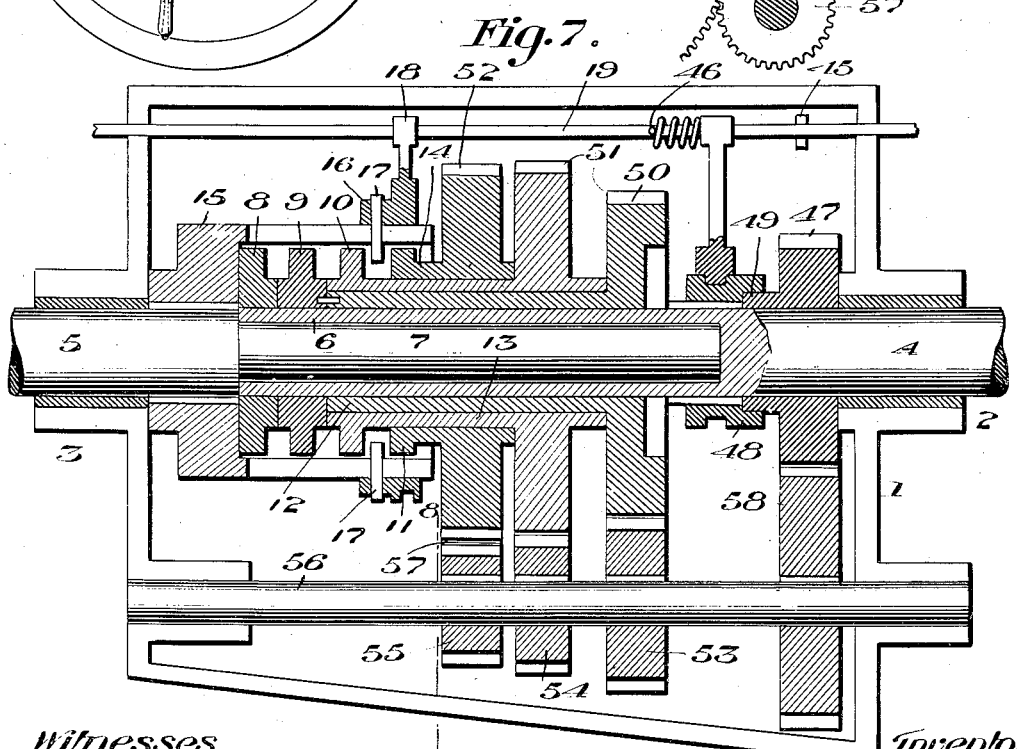
Witnesses
Philip E. Barnes
H. H. Byrne
Inventor
Everette M. Halbert
By Alexander Powell
Attys.

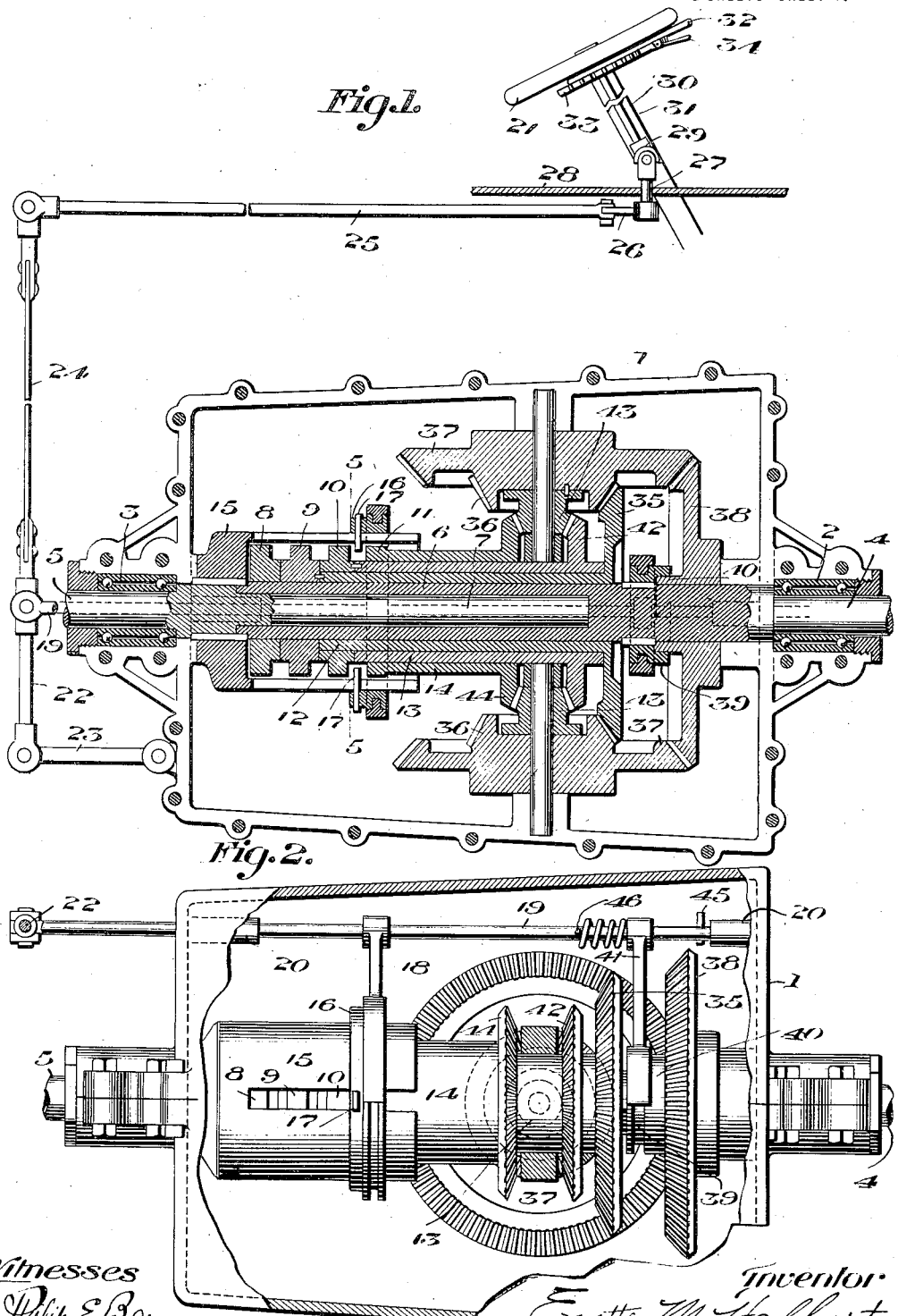

UNITED STATES PATENT OFFICE.

EVERETTE MERLE HALBERT, OF BATTLE CREEK, MICHIGAN.

TRANSMISSION-GEAR FOR AUTOMOBILES.

1,212,210.  Specification of Letters Patent.  Patented Jan. 16, 1917.

Application filed April 22, 1916. Serial No. 92,874.

*To all whom it may concern:*

Be it known that I, EVERETTE M. HALBERT, a citizen of the United States, residing at Battle Creek, in the county of Calhoun and State of Michigan, have invented certain new and useful Improvements in Transmission-Gears for Automobiles; and I hereby declare that the following is a full, clear, and exact description thereof, reference being had to the accompanying drawings, which form part of this specification.

The present invention relates to transmission gearing and consists in the arrangements and combinations of parts hereinafter described and particularly set forth in the accompanying claims.

The invention has for its purpose to provide a system of gearing transmission wherein a variety of speeds or reverse drive may be selected in a convenient and easily performed manner, and in which the respective shaft coupling elements are constructed and assembled in a manner affording quiet and easy operation and with regard to the durability of the mechanism.

A further purpose of the invention resides in adapting the transmission to motor-driven vehicles and having the transmission control mounted on the steering shaft of the car to the end that all gearing selections may be regulated by the hand immediately at the steering wheel.

Another object consists in providing the selective gear control with a tensioning element operable to effect a substantially instantaneous change from one clutch to another in the ordinary operation of the system.

The invention is shown by way of illustration in the accompanying drawings wherein:—

Figure 1 is a longitudinal sectional view, with parts in elevation of the system; Fig. 2 a top plan view of the same with the casing partly broken away; Fig. 3 a detailed view of the clutch collar; Fig. 4 a detailed view of the clutch for the driving shaft. Fig. 5 a sectional view taken on the line 5—5 of Fig. 1; Fig. 6 an elevational view of the gear control mounted on the steering wheel of a car; Fig. 7 a longitudinal sectional view of a modified form of the transmission, and Fig. 8 is a sectional view taken on the line 8—8 of Fig. 7.

Referring to the construction in further detail, the transmission consists of a casing 1, having journal bearings 2 and 3, in which are mounted the driving shaft 4, a driven shaft 5 disposed in axial alinement, and the driving shaft 4 is constructed with a sleeve portion 6, receiving the reduced end 7 of the driven shaft 5. A series of clutch collars 8, 9, 10 and 11, is keyed respectively to the shaft extension 6 and the sleeve portions 12, 13 and 14, and said sleeves are telescopically arranged and journaled on said shaft extension 6, as shown in Fig. 1. Said clutch collars provide selective means for driving the shaft 5 at different speeds from the shaft 4 or reverse thereto.

A casing 15 keyed to the driven shaft 5 is adapted to be coupled with either of said clutch collars for effecting the desired drive from the shaft 4, and a collar 16, shiftably mounted on said casing 15, carries a pair of studs or pins 17 adapted to engage within recesses of either of said collars through the medium of a manually operated control. The slidable collar 16 is connected to a forked arm 18 mounted on the rod 19, which is in turn slidably mounted in bearings 20 in the casing 1 (see Fig. 2).

The gear shifting rod 19 is operated from the steering wheel 21 of the vehicle by the lever 22 fulcrumed on a link 23 that is mounted on the casing, and said lever 22 has a resilient portion 24 for the purpose to be presently explained. A reach rod 25 connects the lever arm 24 with the crank arm 26 of the stud shaft 27, that is suitably journaled in the frame 28 of the car. A universal joint 29 connects said shaft 27 with the turning shaft 30 that is mounted on the steering shaft 31, and a hand-operated lever 32 is secured to the shaft 30 immediately adjacent the steering wheel 21, to the end that the gear may be shifted without requiring the driver to move his arm an appreciable distance from the car control. A quadrant plate 33 having the usual notches is provided for engaging with the pawl 34 to hold the gear control in set position. It will be understood that the gear shifting lever 32 may be mounted at the bottom of the car, or in any other position.

The shaft 5 is connected to be driven directly from the shaft 4, and at the speed of the latter by coupling the casing 15 with the clutch collar 8, and for driving the shaft 5 at a reduced speed, the casing 15 is connected to the clutch collar 9, whose sleeve 12 carries the bevel gear 35, meshing with the smaller bevel gears 36 of the double gears (36 and 37), and gears 37 mesh with the bevel gear 38, that is loosely journaled on the shaft 4. A clutch collar 39, splined on the shaft 4, is adapted to engage with a clutch element 40 on the bevel gear 38 for connecting said gear to operate with said shaft 4, or be freed therefrom, and the clutch collar 39 is carried by the forked arm 41 that is slidably mounted on the shiftable rod 19 (see Fig. 2).

The shaft 5 is driven at another speed by connecting the casing 15 with the collar 10 when the transmission is through the sleeve 13 and bevel gear 42 meshing with the small bevel gears 43 that are keyed to the double gears (36 and 37). The reverse drive for the shaft 5 is effected by connecting the casing 15 with the collar 11 on the sleeve 14, and said sleeve 14 has a bevel gear 44 meshing with the gear wheels 43 on the side opposite the gears 42, and said pinions 43 are driven from the shaft 4, through the gearing 37 and 38.

The selective clutch is adapted to be shifted from one coupling member to engage another in an accelerated manner, and to this end the rod shifting lever 22 has the flexible portion 24 heretofore referred to. The spring lever arm 24 allows the controlling lever 32 to be moved on the quadrant sufficiently to pass pins 17 from 8 to 9, 9 to 10, or 10 to 11, without disengaging said pins from 8, 9, 10 or 11, as long as the power of the engine is applied on said pins 17 through the collars 8, 9, 10 or 11, thereby enabling the operator to move the lever 32 only when a change of speed is anticipated, and when the change of speed is to be made, all that is required is to release the pressure on pin 17 by releasing the clutch when the spring arm 24 will throw the coupling pins 17 to engage the selected clutch for the speed desired.

The gear shifting rod 19 carries a pin 45 adapted to engage the clutch arm 41 and disconnect the clutch (39 and 40), when the clutch member 16 has been shifted to engage with the clutch element 8, i. e., the gear wheel 38 is disconnected when the shaft 6 is connected directly with the casing 15 of the shaft 5. A second pin 46 on the rod 19 serves to restore the clutch (39 and 40) when the clutch collar 16 is shifted from engagement with the clutch collar 8, or for connecting with either of the clutch members 9, 10 and 11, when the transmission is through the pinion gear-wheel 38. If desired a helical expansion spring may be strung on rod 19 between pin 46 and the arm 41 as indicated in Figs. 2 and 7.

The arrangement shown in Fig. 7 is the same as that described, except that in this instance straight gears are used in place of bevel gears, though in operation and manner of gear selection the system is the same as that above described.

The driven shaft 4 has a pinion 47 loosely mounted thereon but connected to be rotated therewith by the clutch (48 and 49) after the manner of the clutch (39 and 40) of Fig. 1, and the several clutch collars 8, 9, 10 and 11 are adapted to be conected with the shiftable clutch collar 16 for driving the shaft 5 through the casing 15 in the manner explained. The several clutches 9, 10 and 11 have sleeve portions 12, 13, and 14 carrying gear wheels 50, 51 and 52, respectively, meshing with pinions 53, 54 and 55, mounted on the counter-shaft 56. The reverse drive for the shaft 5 from the shaft 4 is effected between the pinions 52 and 55 by the idler 57 in gear therewith, as shown in Fig. 8, and the counter shaft 56 is geared to the driving shaft 4 by the pinion 58, meshing with pinion 47.

It is obvious that those skilled in the art may vary the details of construction and arrangement of parts without departing from the spirit of my invention, and therefore I do not wish to be limited to such features except as may be required by the claims.

What I claim is:

1. In a transmission gearing the combination of a driving shaft, a driven shaft, a member keyed to the driven shaft, clutch elements associated with said driving shaft, gearing connections between said driving shaft and the respective clutch elements, a shiftable element mounted on said member and adapted to selectively engage said clutch elements, and means for actuating the shiftable element, substantially as described.

2. In a transmission gearing the combination of a driving shaft, a driven shaft co-axial with the driving shaft, a member keyed to the driven shaft, clutch elements mounted on the driving shaft, connections between the respective clutch elements and said driving shaft, a shiftable element mounted on the member and adapted to selectively engage with said clutch elements; and means for actuating the shiftable element, substantially as described.

3. In a transmission gearing the combination of a driving shaft, a driven shaft co-axial with the driving shaft, a member keyed to the driven shaft, clutch elements mounted on the driving shaft and having sleeve portions, gearing connections between said sleeve portions and the driving shaft, a collar slidably mounted on said member, an element carried by said collar adapted to selectively engage with said clutch elements; and means for actuating the collar to shift the said element, substantially as described.

4. In a transmission gearing the combination of a driving shaft, a driven shaft co-axial with the driving shaft, a member keyed to the driven shaft, clutch collars mounted on the driving shaft and constructed with sleeves, gearing connections between said sleeves and the driving shaft, a collar slidably mounted on said member, pins carried by said slidable collar adapted to selectively engage with said clutch collars, and means for actuating the collar, substantially as described.

5. In a transmission gearing the combination of a driving shaft, a driven shaft, a casing keyed to the driven shaft, clutch elements located within said casing, gearing connections between the respective clutch elements and said driving shaft, a clutch element mounted on the casing and adapted to selectively engage with said clutch elements, and means for actuating the selective clutch element, substantially as described.

6. In a transmission gearing the combination of a driving shaft, a driven shaft co-axial with the driving shaft, a casing keyed to the driven shaft, clutch elements mounted on the driving shaft within said casing, gearing connections between the respective clutch elements and said driving shaft, a shiftable clutch element mounted on the casing and adapted to selectively engage with said clutch elements; and means for acuating the shiftable clutch element, substantially as described.

7. In a transmission gearing the combination of a driving shaft, a driven shaft co-axial with the driving shaft, a casing keyed to the driven shaft, clutch elements mounted on the driving shaft within said casing and having sleeve portions, gearing connections between said sleeve portions and the driving shaft, a collar slidably mounted on said casing, a clutch element carried by said collar adapted to selectively engage with said clutch elements; and means for actuating the collar to shift the selective clutch element, substantially as described.

8. In a transmission gearing the combination of a driving shaft, a driven shaft co-axial with the driving shaft, a casing keyed to the driven shaft and provided with longitudinally disposed slots, clutch collars mounted on the driving shaft and constructed with sleeves, gearing connections between said sleeves and the driving shaft, a collar slidably mounted on said casing, pins carried by said slidable collar projecting through said casing slots and adapted to selectively engage with said clutch collars, and means for actuating the collar, substantially as described.

9. In a transmission gearing the combination of a driving shaft, a driven shaft co-axial with the driving shaft, a casing keyed to the driven shaft, clutch collars mounted on the driving shaft within said casing, gearing connections including a clutch between certain of the respective clutch collars and the driving shaft, a clutch element slidably mounted on the casing and adapted to selectively engage with said clutch collars, said slidable clutch element adapted to connect the driving shaft directly with the casing to directly drive the driven shaft, means for actuating the selective clutch element, and means for automatically disconnecting the clutch of the gearing connections by the selective clutch actuating means when the driving shaft and casing are directly connected, substantially as described.

10. In a transmission gearing the combination of a driving shaft, a driven shaft co-axial with the driving shaft, a casing keyed to the driven shaft and provided with longitudinally disposed slots, a clutch collar mounted on the driving shaft, clutch collars having telescoping sleeves mounted on the driving shaft, variable speed and reverse gearing connections between said sleeves and the driving shaft, a clutch between said gearing connections and the driving shaft, a collar slidably mounted on said casing, pins carried by said slidable collar projecting through said casing slots and adapted to selectively engage with said clutch collars, means for actuating the collar, and means for automatically disconnecting the clutch of the gearing connections by said selective clutch element when the driving shaft collar is connected to said shiftable clutch collar, substantially as described.

11. In a transmission gearing the combination of a driving shaft, a driven shaft, clutch elements associated with one of said shafts, a selective clutch element connected to the other of said shafts and associated with said clutch elements, gearing connections between the respective clutch elements and the driving shaft, and means for actuating the selective clutch element comprising a resilient member adapted to be initially tensioned for effecting an instantaneous coupling between the elements of the selected clutch, substantially as described.

12. In a transmission gearing the combination of a driving shaft, a driven shaft, clutch elements associated with one of said shafts, a selective clutch element connected to the other of said shafts and associated with said clutch elements, gearing connections between the respective clutch elements and the driving shaft, and means for actuating the selective clutch elements comprising a flexible lever adapted to be initially tensioned for effecting an instantaneous coupling between the elements of the selected clutch, substantially as described.

13. In a transmission gearing for motor driven vehicles the combination of a driving shaft, a driven shaft, selective clutch elements between said shafts comprising a shiftable member, gearing connections between said clutch elements and the driving shaft, a vehicle steering shaft, and means associated with the vehicle steering shaft for operating said shiftable clutch member, substantially as described.

14. In a transmission gearing for motor driven vehicles having a steering shaft, the combination of a driving shaft, a driven shaft, selective clutch elements between said shafts comprising a shiftable member, gearing connections between said clutch elements and the driving shaft, a lever mechanism connected to actuate the shiftable clutch member, and an operating handle for said lever mechanism mounted on the vehicle steering shaft, substantially as described.

15. In a transmission gearing for motor driven vehicles having a steering shaft, the combination of a driving shaft, a driven shaft, selective clutch elements between said shafts comprising a shiftable member, gearing connections between said clutch elements and the driving shaft, a lever mechanism connected to actuate the shiftable clutch member, a clutch control shaft mounted on the steering shaft connected to said lever mechanism, and a hand operated lever connected to actuate the clutch control shaft, substantially as described.

16. In a transmission gearing for motor driven vehicles the combination of a driving shaft, a driven shaft, selective clutch elements between said shafts comprising a shiftable member, gearing connections between the clutch elements and the driving shaft, a vehicle steering shaft, a lever connected to the shiftable clutch element, a rod connected to said lever, a clutch control shaft mounted on the steering shaft and connected to said rod, a hand operated lever, and a gearing connection between the hand operated lever and said clutch control shaft, substantially as described.

In testimony that I claim the foregoing as my own, I affix my signature.

EVERETTE MERLE HALBERT.